UNITED STATES PATENT OFFICE.

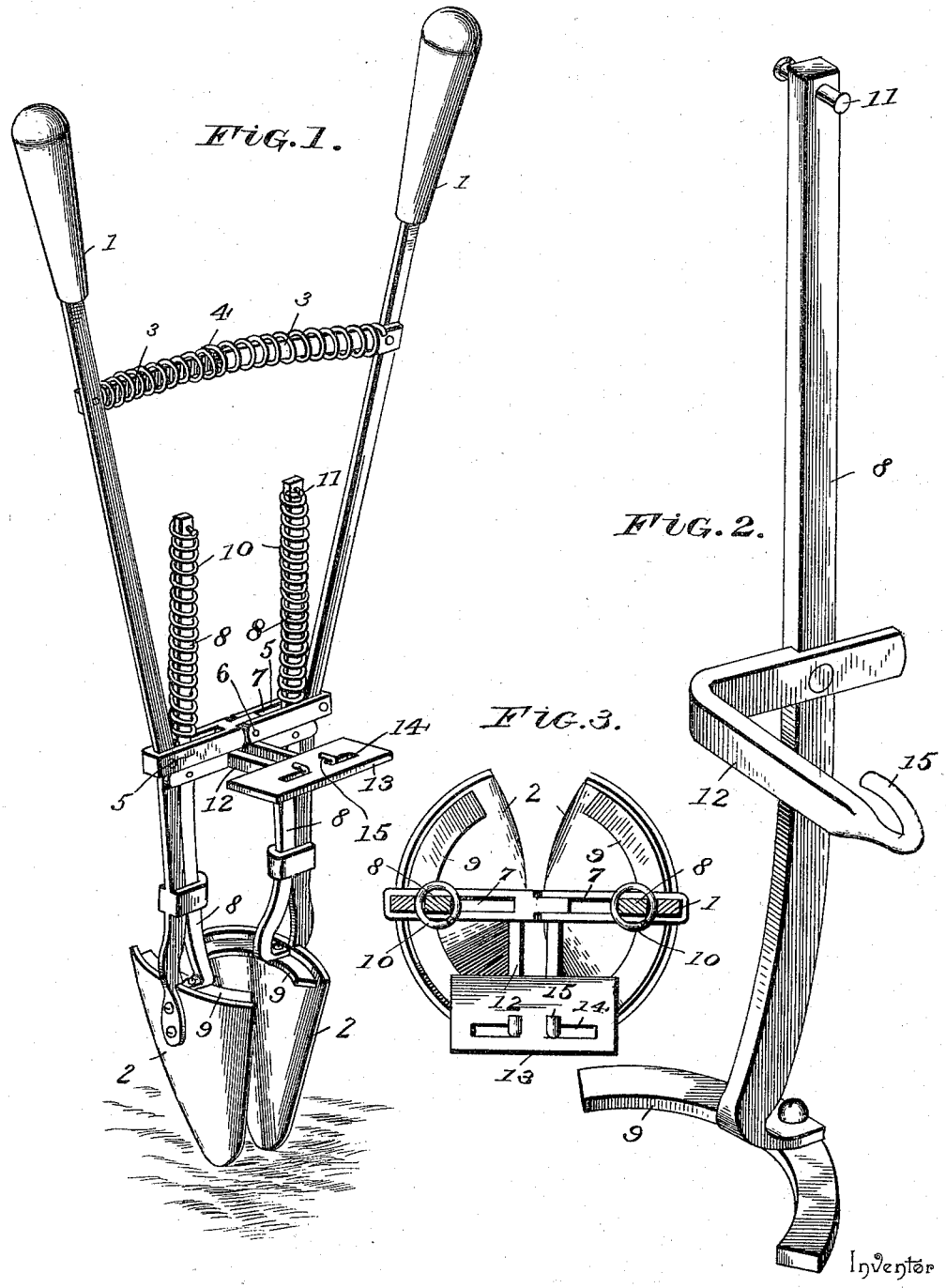

WILLIAM J. DOYLE, OF PENN, NORTH DAKOTA.

TRANSPLANTER.

SPECIFICATION forming part of Letters Patent No. 541,841, dated July 2, 1895.

Application filed August 4, 1894. Serial No. 519,514. (No model.)

*To all whom it may concern:*

Be it known that I, WILLIAM J. DOYLE, a citizen of the United States, residing at Penn, in the county of Ramsey and State of North Dakota, have invented a new and useful Transplanter, of which the following is a specification.

My invention relates to transplanters, and it has for its object to provide a simple, inexpensive, and efficient device adapted to remove from the ground a plant, shrub, or tree and place it in a hole provided for its reception, the earth being packed around said plant by the same operation which removes it from the shovels of the apparatus, the device being further designed to remove the plant without disturbing its roots or the earth contiguous thereto.

Further objects and advantages of the invention will appear in the following description, and the novel features thereof will be particularly pointed out in the appended claims.

In the drawings, Figure 1 is a perspective view of an apparatus embodying my invention. Fig. 2 is a detail view of one of the packers, detached. Fig. 3 is a horizontal sectional view of the transplanter on a plane above the foot-rest.

Similar numerals of reference indicate corresponding parts in all the figures of the drawings.

1 designates the handles which are provided at their lower ends with the inwardly concaved shovels 2, adapted to be pressed into the soil around a plant, and attached to the handles near their upper ends are the guides 3 which support a coiled spring 4, adapted to separate the handles and thereby press the shovels toward each other when released.

The pivotal connection of the handles is accomplished by means of the arms 5, the inner ends of which are respectively reduced and bifurcated and are united by the pivot 6, said arms being provided with slots or guides 7 for the reception of the stems 8 of the packers. These packers are provided at their lower ends with crescent shaped or segmental heads 9, which correspond in curvature with the inner surfaces of the shovels and are arranged adjacent thereto, and the upper ends of the stems project above the arms 5 and are fitted with actuating springs 10 which bear at their upper ends against the pins 11 and thus normally hold the packers in their elevated position. Attached to the stems of the packers, below the plane of the arms 5, are the brackets 12 which support the foot-rest 13, said foot-rest being slotted as shown at 14 for the reception of studs 15 on the extremities of the brackets, whereby the free manipulation of the handles of the transplanter is not impeded.

In operation, the shovels are separated by pressing the upper ends of the handles toward each other, and the shovels are pressed into the soil around the plant to be moved. After the shovels have been depressed sufficiently to extend below the lowermost roots of the plant the handles are released to allow the spring 4 to press the shovels inward and hold the soil therebetween. The apparatus is then elevated to remove the plant from the ground and after being carried to the point for replanting is inserted into the hole provided for the reception of the plant, when the foot is placed upon the foot-rest and the packers are depressed as the shovels are withdrawn, thus leaving the plant in place in an upright position and simultaneously packing the earth around the roots thereof.

From the description it will be seen that the device is simple in construction and may be manipulated with facility, and furthermore it will be understood that various changes in the form, proportion, and minor changes in construction may be resorted to without departing from the spirit or sacrificing any of the advantages of the invention.

Having thus described my invention, I claim—

1. In a transplanter, the combination of opposite shovels having pivotally connected handles, packers independently mounted to slide upon the handles of the shovels and having heads operating contiguous to and parallel with the inner or facing surfaces of the shovels, and connections between the packers whereby they may be simultaneously elevated or depressed independently of the swinging movement of the shovels, substantially as specified.

2. In a transplanter, the combination of shovels, pivotally connected handles carrying said shovels, packers having their stems respectively mounted to slide upon the handles and provided with heads operating in contact with the surfaces of the shovels, retracting springs for the packers, brackets secured to the stems of the packers, and a foot-rest having slotted connection with both brackets whereby the packers may be simultaneously depressed independently of the operation of the shovels, substantially as specified.

3. In a transplanter, the combination of concaved shovels, pivotally connected handles carrying said shovels, packers having their stems slidably mounted upon the handles and provided with segmental heads operating in the concave surfaces of the shovels, an actuating spring arranged between the handles to press the shovels toward each other, retracting springs for the packers, brackets affixed to the stems of the packers, and a slotted foot-rest supported by said brackets, studs on said brackets being engaged with the slot in the foot-rest to permit free movement of the handles, substantially as specified.

In testimony that I claim the foregoing as my own I have hereto affixed my signature in the presence of two witnesses.

WILLIAM J. DOYLE.

Witnesses:
A. A. EVESON,
HANS A. MOE.